United States Patent [19]
Padilla

[11] Patent Number: 5,869,159
[45] Date of Patent: Feb. 9, 1999

[54] CUSHIONED POLE COVER AND METHOD OF APPLYING THE COVER

[76] Inventor: Carl Padilla, 350 River Valley Rd., Stratford, Conn. 06497

[21] Appl. No.: 655,725

[22] Filed: May 30, 1996

[51] Int. Cl.⁶ .................................................. B32B 3/00
[52] U.S. Cl. ........................... 428/40.1; 52/727; 52/728; 52/731; 138/139; 138/151; 138/168; 428/41.7; 428/41.8; 428/42.2; 428/68; 428/69; 428/72; 428/192; 428/194; 428/213
[58] Field of Search .................. 428/40.1, 41.7, 428/41.8, 42.2, 213, 69, 72, 68, 192, 194; 52/727, 728, 731; 138/139, 151, 168

[56] References Cited

U.S. PATENT DOCUMENTS

| | | | |
|---|---|---|---|
| 1,811,984 | 6/1931 | Taft | 138/149 |
| 3,181,849 | 5/1965 | Mitchell | 267/1 |
| 3,560,287 | 2/1971 | Helling | 156/218 |
| 3,884,495 | 5/1975 | Petock | 248/345.1 |
| 4,605,043 | 8/1986 | Grenier | 138/149 |
| 4,606,167 | 8/1986 | Thorne | 52/727 |
| 4,748,060 | 5/1988 | Fry et al. | 138/151 |
| 5,006,386 | 4/1991 | Menichini | 428/58 |
| 5,173,990 | 12/1992 | Owen | 248/345.1 |
| 5,542,237 | 8/1996 | Grey | 53/472 |

*Primary Examiner*—Nasser Ahmad
*Attorney, Agent, or Firm*—St. Onge Steward Johnston & Reens LLC

[57] ABSTRACT

A method and a kit for cushioning and covering a pole is disclosed. First and second sheets of cushioning material are wrapped around a pole, with the second sheet of cushioning material being cut to fit the height of the pole. A first cover sheet is applied to the cushion sheet and is secured in place to cover a portion of the pole. A second cover sheet is applied to the cushion sheet and overlaps the first cover sheet to finish the pole, thereby providing a cushioned pole that is covered with an abrasion resistant, tough cover.

21 Claims, 2 Drawing Sheets

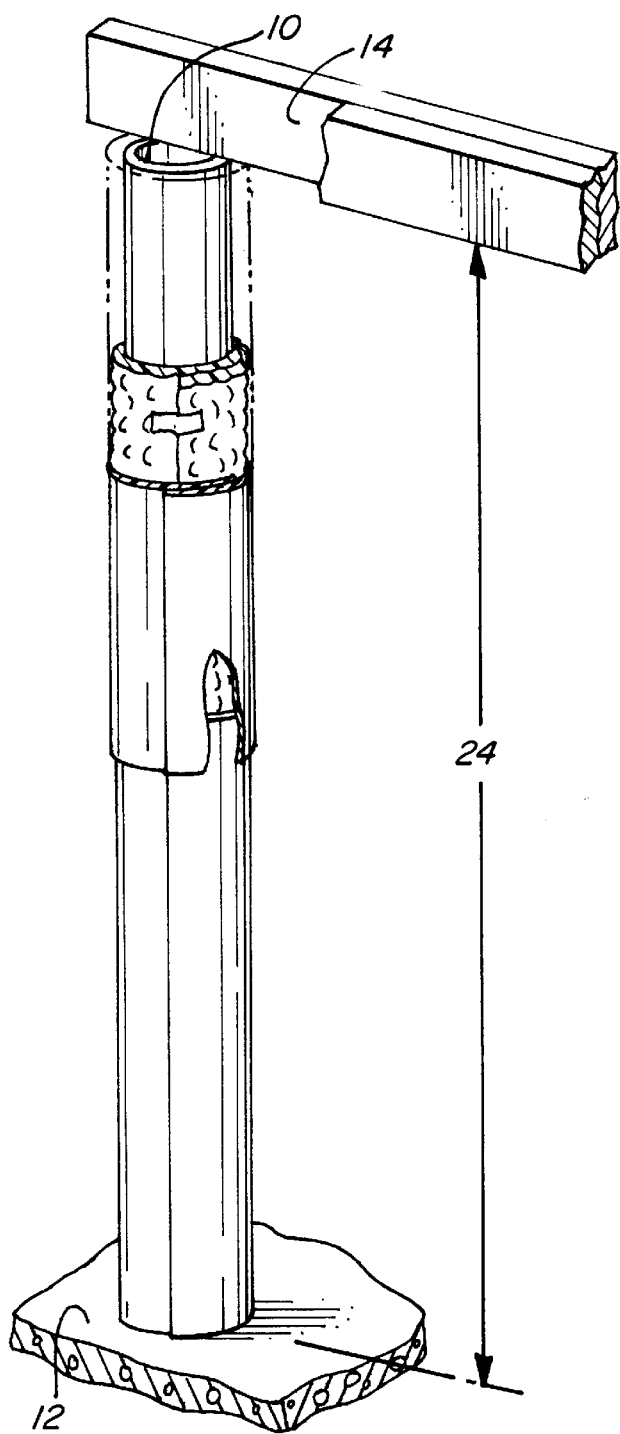
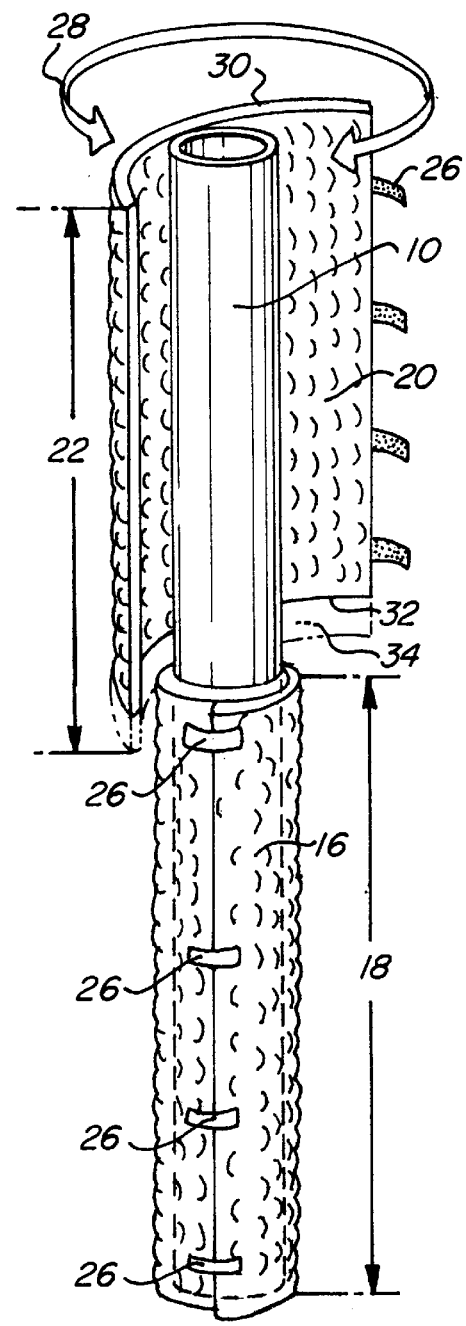
FIG. 1
FIG. 2

CUSHIONED POLE COVER AND METHOD OF APPLYING THE COVER

BACKGROUND OF THE INVENTION

1. Field of the Invention

The present invention relates to providing a cover that both cushions and provides a finished surface for a pole. More specifically, the present invention relates to cushioning and covering a lally column of the type found in the basement of a residence or office. Further, the invention relates to cushioning and covering various types of cylindrical poles where it is desired to provide a finished exterior surface and at the same time cushion the pole.

2. Brief Description of the Prior Art

In conventional residential and commercial construction, the structure's first floor is typically supported by a foundation that runs around the periphery of the building as well as by a number of lally columns that support horizontal joists, which in turn support the flooring above the joists. These lally columns are typically cylindrical steel poles having a height of about 7½ feet and a diameter of 2 to 12 inches. Typically, one end of the lally column supports the joist above and the other end is supported by the concrete floor of the basement. Further, lally columns can be used in types of environs other than basements.

The steel lally columns are often finished with paint. The steel lally columns tend to weather or rust because they are stored outside in construction yards prior to installation in buildings. Thus, the exterior surfaces lally columns are rough and unsightly. When a basement room is being finished to create a recreation room, in the case of a house, or a storage room, in the case of a commercial building, the lally columns present a hazard. More specifically, in a basement recreation room, children tend to play games or ride tricycles, and a steel lally column presents a serious risk of injury.

Steel poles are also used in environs other than in basements or as lally columns. More specifically, steel poles are used to support basketball backboards and rims, volleyball nets and other sports equipment. It would be desirable to cushion the poles against the impact of humans playing sports in the area adjacent the pole.

In the case of a basketball backboard support pole, these poles are wrapped with a thick pad of foam rubber encased in a vinyl fabric cover. The foam pads are held in position with buckles or other attachment means that are unsightly and bulky. U.S. Pat. No. 3,181,849 discloses a shock absorbing guard for a pole which is made of a molded rubber composition or a synthetic rubber product. The cylindrical pad is attached to the pole with two plates that are screwed together. The shock absorbing guard disclosed in this patent would be very expensive to manufacture and would be unsightly because of the method of attachment and would absorb moisture due to the nature of material used. Various types of pole covers are disclosed in the following patents: U.S. Pat. No. 5,006,386 to Menichini; U.S. Pat. No. 3,884,495 to Petock; U.S. Pat. No. 5,173,990 to Owen; and U.S. Pat. No. 4,606,167 to Thorne. All of these patents disclose complicated pole guards that result in unsightly and cumbersome attachment mechanisms. In the heating and plumbing field, it is often desirable to jacket pipes to insulate for heat loss. The following U.S. Patents disclose pipe coverings in the non-analogous field of plumping, which covers would not be suitable for finishing and providing a cushion for a lally column, a basketball pole or similar pole support: U.S. Pat. No. 1,811,984 to Taft; U.S. Pat. No. 4,605,043 to Grenier; U.S. Pat. No. 4,748,060 to Fry et al.; and U.S. Pat. No. 3,560,287 to Helling.

It is an object of the present invention to provide a cushioned pole cover and method of applying the cover so that lally columns in existing structures can be finished. It is a further object of the invention to provide a kit for covering a lally column wherein the height of the cover can be sized to the height of the lally column.

It is a further object of the invention to provide a method of covering a pole that can be done by an unskilled person using common household tools, such as scissors and the like. It is a further object of the invention to provide a cover that is inexpensive to produce, that is relatively lightweight and that can be shipped in a compact form.

It is a further object of the invention to provide a cover that has a high gloss smooth surface that is made of a tough, durable material, and preferably a material that is maintenance free and easy to clean. It is a further object of the invention to cover the pole with materials that will not absorb moisture.

It is also an object of the invention to provide a kit for covering a lally column or other pole that can be installed in a few minutes. It is a further object of the invention to provide a cushioning cover that will cushion impact and will maintain its shape after impact.

SUMMARY OF THE INVENTION

In accordance with the present invention a kit for cushioning and finishing a lally column or other pole is provided. The kit comprises a first sheet of cushioning material having a generally rectangular shape and having a width at least equal to the circumference of the pole to permit the sheet to be wrapped around the pole. It is preferred that the sheet of cushioning material be wrapped around the pole approximately two times and that the material be made from flexible closed cell plastic film, also referred to as "bubble wrap."

A second sheet of cushioning material preferably having substantially the same rectangular shape and dimensions as the first sheet is provided and also has a width at least equal to the circumference of the pole to permit the sheet to be wrapped around the pole, preferably approximately two times. The first and second sheets have a combined height that is greater than the height of the pole. During installation of the first and second sheets, the first sheet is placed so that one edge abuts the floor, and the first sheet is wrapped tightly around the pole and secured to the pole by the use of adhesive tape. The second sheet is wrapped loosely around the pole and pushed to the top of the pole so the top edge of the sheet abuts the ceiling. In the case of a lally column, this will create an overlap of the second cushion sheet over the first cushion sheet. The second sheet is marked at the place where it begins to overlap the first sheet and is cut along such marking with a common household pair of scissors. Once the second sheet is cut to the desired height, it is then wrapped tightly around the pole and secured in place with adhesive tape. Thus, the pole is now cushioned, and a cover is placed on the pole.

A first cover sheet is provided and has a width greater than the circumference of the cushioned pole. A second cover sheet is provided and has a width greater than the circumference of the cushioned pole. The cover sheets are preferably made of a thin polymeric material, and most preferably polyvinyl chloride sheeting having a thickness of between about 0.01 and about 0.1 inch, most preferably about 0.015 to about 0.05 inch. An adhesive is located on the interior surface of both of the cover sheets and adheres the cover sheets to the cushioned sheets to provide a smooth and generally uniform exterior surface for the pole. Preferably, the combined height of the first and second cover sheets is substantially greater than the height of the lally column, and one of the cover sheets overlaps the other.

In accordance with the method of installation, the first cover sheet is placed with its bottom edge abutting the floor, and the first cover sheet is wrapped tightly over the cushion material which has already been applied to the pole. The first cover sheet is adhered to the first cushion sheet by the adhesive on the interior surface of the cover sheet. The second cover sheet is located so that its top edge abuts the ceiling of the basement, and the second cover sheet is wrapped tightly over and adhered to the second sheet of cushion material. Because the combined height of the first and second cover sheets is greater than the height of the lally column, a substantial overlap is provided, thereby providing a smooth, nearly continuous surface. Since the exterior surface of the polymeric cover sheet is preferably finished in a smooth, attractive manner, once the cover sheets are applied to the cushion sheets, the pole is finished.

Preferably, the adhesive on the inside of the cover sheets is self-stick adhesive applied along at least one edge, and preferably three edges of each of the first and second cover sheets. A removable release tape is placed over the adhesive and may be removed to expose the adhesive during application of the cover sheets.

A person installing the kit can install a cover in five to ten minutes with standard household tools such as a pair of scissors.

The bubble wrap material is thin and can be easily cut with a conventional pair of scissors and can be sized to the desired height of the lally column. The tough cover sheets, which are preferably made of polyvinyl chloride sheet plastic, need not be cut nor measured to fit and may be installed in an overlapping fashion. The cover sheets are made of a tough, abrasion resistant plastic which covers the pole and protects the underlying bubble wrap. Thus, when the covered pole is impacted by a person or object, the cover sheet flexes inwardly against the underlying bubble wrap and cushions the impact. Because the cover sheets have some resiliency, they will return to the original shape after impact.

The kit includes two cushion sheets and two cover sheets as well as instructions, and may optionally include adhesive tape. The four sheets of material may be tightly wound together and wrapped in a cylindrical package, thus simplifying shipment of the product and ease of transport by the consumer.

These and other advantages of a kit for cushioning and finishing a pole and a method of finishing a pole will be apparent from the following detailed description of the invention with reference to the drawings.

BRIEF DESCRIPTION OF THE DRAWINGS

FIG. 1 is a perspective view of a lally column that has been covered with a kit for cushioning and finishing a pole;

FIG. 2 is a perspective view of a pole wherein the pole is being covered in accordance with the first step of the method of applying a cushion sheet;

DETAILED DESCRIPTION

Figure 3:
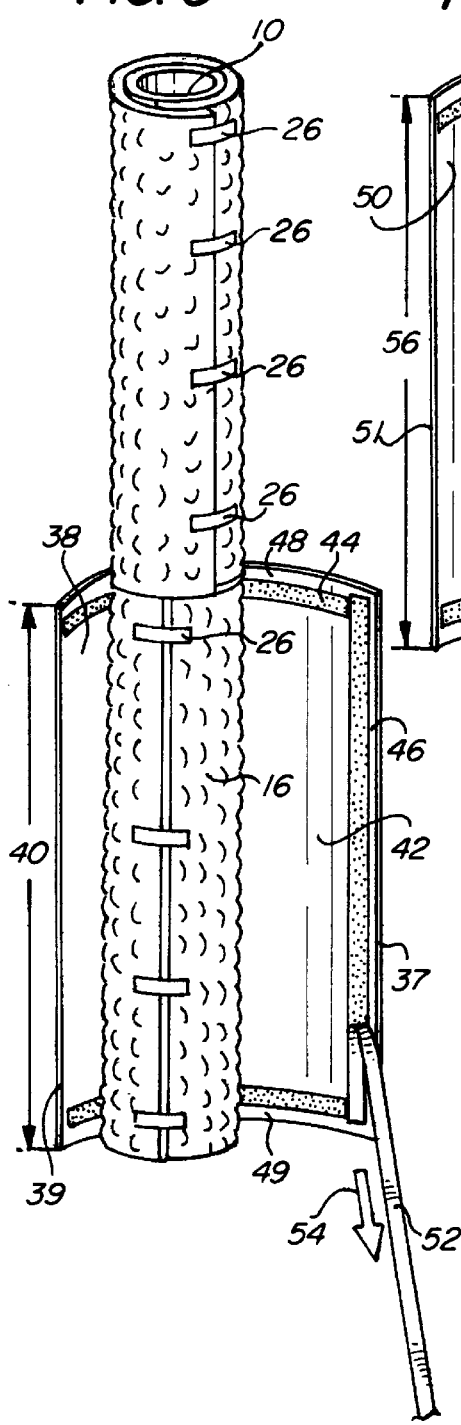
FIG. 3 is a perspective view of a pole wherein the pole is being covered in accordance with the second step of the method of applying a cover.
Figure 4:
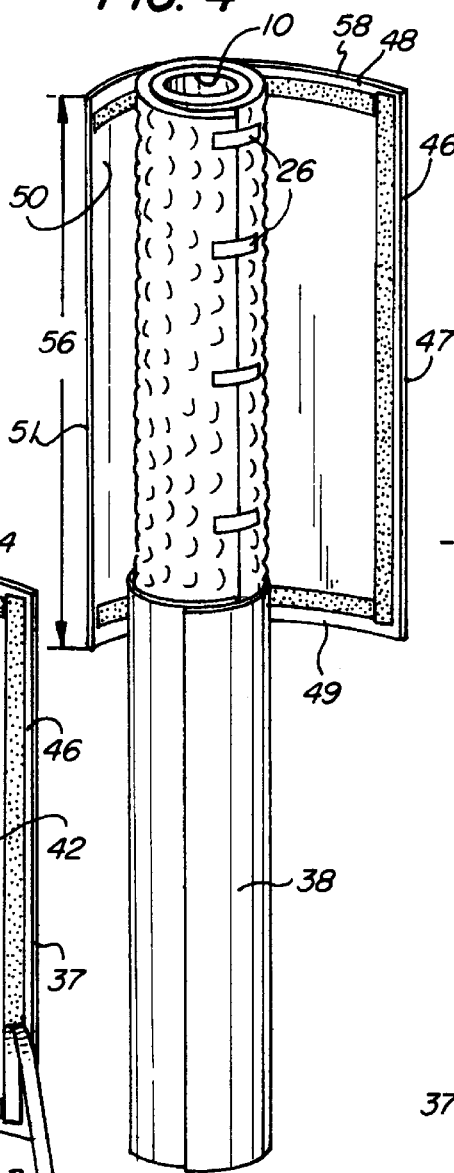
FIG. 4 is a perspective view of a pole wherein the pole is being covered in accordance with the third step of the method of applying a cover.

Referring to FIG. 1, a pole covered in accordance with the present invention is shown. A lally column 10 is of the type that is typically found in the basement of a residence or commercial building and comprises a cylindrical steel pole that is supported on a concrete floor 12. The upper end of the pole 10 supports a joist 14. In the basement of a typical residence, there may be as few as six and as many as 30 lally columns for supporting the floor joists 14. The lally column typically has a height of between about 6 and about 10 feet, and a typical height for a lally column used in the United States is about 7½ feet. A lally column has an external diameter of between about 2 and about 12 inches. A typical lally column used in the United States has an exterior diameter of approximately 4 inches. As shown in FIG. 1, the cover sheet and the cushioning material is broken away at the upper region of the covered pole to expose the internal construction of the pole cover. Referring to FIGS. 2–4, the method of applying the kit for cushioning and finishing the pole will be described in detail, with each of the components described in detail.

Referring to FIG. 2, the pole 10 is first wrapped with a first sheet of cushioning material 16 that has a rectangular shape having a width at least equal to the circumference of the pole 10 to permit the sheet to be wrapped around the pole 10 completely. Preferably, the sheet of cushioning material 16 is wrapped around the pole 10 approximately two times. The sheet 16 has a height 18. A second sheet of cushioning material 20 is provided and preferably has the same dimensions as the first sheet 16. The sheet 20 preferably has a height 22 that is equal to the height 18 of the first cushioning sheet 16. As shown in FIG. 1, the lally column pole 10 has a height 24. Preferably, the combination of heights 18 and 22 is larger than the height 24 of pole 10.

Referring to FIG. 2, the first cushioning sheet 16 is placed on the pole 10 and tightly secured in position with adhesive tape 26 that may optionally be supplied with the kit. Once the first cushion sheet 16 is placed in position, the second cushion sheet 20 is wrapped loosely around pole 10 as shown by arrow 28. The upper edge 30 of the top cushion sheet 20 is placed against the under surface of joist 14 (joist 14 is shown in FIG. 1), and thus, the second cushion sheet 20 will overlap slightly with the first cover sheet 16. The person installing the second cushion sheet 20 will mark with a pen the position of overlap, and a line 32 will be drawn on the sheet 20 of cushion material, defining an overlap segment 34. The installer will then cut the sheet 20 with a pair of scissors or other conventional cutting tool to remove segment 34 of sheet 20. Once the segment 34 has been removed, the sum of heights 18 and 22 of sheets 16 and 20 will be equal to the height 24 of pole 10, and then the second cover sheet 20 can be wrapped tightly around the pole 10 and secured in place with adhesive tape 26. In the case of a drop ceiling or raised floor, the height 24 would be the distance between the floor and the ceiling.

Cushion sheets 16 and 20 are preferably flexible closed cell plastic film, also referred to as "bubble wrap." The plastic film is made from the primary component polyethylene and has air pockets or bubbles spaced throughout the surface of the material. Preferably, the material includes nylon in a weight percent of five percent or more. The nylon increases the bursting strength and reduces the loss of air from inside the bubbles. The thickness of the material ranges from about 0.2 inch to about 1 inch. The flexible closed cell plastic film is quite useful in connection with the cover of the present invention, because it is relatively inexpensive, generally available, and can be cut with ordinary household tools such as scissors or a knife. When wrapped around a pole at least one time, and preferably two times, the flexible closed cell plastic film provides an excellent cushion. However, the flexible closed cell plastic film is not sufficiently durable to be used as an exterior surface. More specifically, the material that forms the closed cell bubbles is thin polymeric material, more particularly, a thin polyethylene material, and may puncture or pop under pressure.

Referring to FIG. 3, the next step in the process of applying a cover will now be described. A first cover sheet 38 is secured to the bottom of the pole 10. The cover sheet 38 has a width greater than the circumference of the cushioned pole 10. The first cover sheet 38 has a height 40 which is preferably between 3 and 5 feet, and most preferably 4 feet. A second cover sheet 50 is provided and preferably has the same dimensions as the first cover sheet 38. The cover sheets 38 and 50 have an interior surface 42 that has an adhesive 44 applied to the surface 42. More specifically, the adhesive strip 44 runs along at least one edge 46 of the cover sheets 38 and 50. Preferably, the strips of adhesive 44 run along three edges 46, 48 and 49 of cover sheets 38 and 50. The adhesive strip 44 is covered with a release tape 52 that may be peeled away as shown by arrow 54 in FIG. 3. When cover sheet 38 is placed upon the pole 10, it is wrapped tightly around the cushion sheet 16 and adhered in place with adhesive strip 44, as shown particularly well in FIG. 4.

Figure 5:
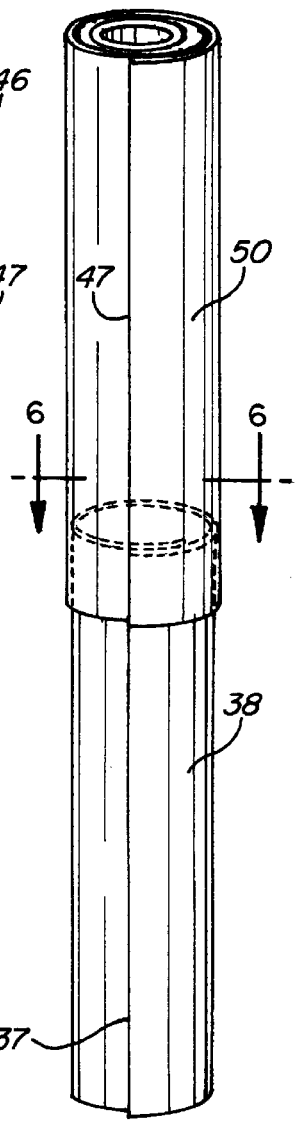
FIG. 5 is a perspective view of a pole after a kit for cushioning and finishing the pole has been applied.
Figure 6:
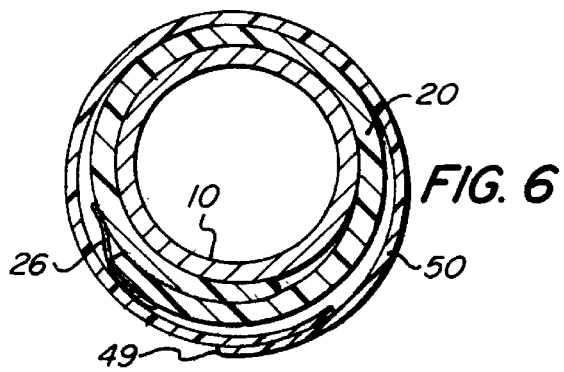
FIG. 6 is a sectional view along the plane 6—6 of FIG. 5.

As shown in FIG. 4, the second cover sheet has a height 56. Preferably, the combined height 40 and 56 of the two cover sheets 38 and 50 is substantially greater than the height 24 of the pole 10. Thus, as shown in FIGS. 4 and 5, when the top edge 58 of the cover sheet 50 is placed adjacent the underside of the joist 14, the bottom of cover sheet 50 overlaps cover sheet 38 by at least several inches.

The cover sheets 38 and 50 have beginning edges 39 and 51 that are aligned when installed so that the finishing edges 37 and 47 also align.

The cover sheets 38 and 50 preferably have the same width and height, although this is not necessary. In the most preferred embodiment of the invention, the height 18 of cushion sheet 16, the height 22 of cushion sheet 20, the height 40 of cover sheet 38 and the height 56 of cover sheet 50 are substantially equal. When a kit containing the various components is shipped, the two cushion sheets and the two cover sheets are wrapped together, and form a lightweight package that can be shipped inexpensively.

The cover sheets 38 and 50 are preferably made from a thin polymeric material that is abrasion resistant, and that is resilient so that when it is impacted, it will return to its original shape. In accordance with a preferred aspect of the invention, a thin sheet made from polyvinyl chloride is preferred. It is preferred that the polymeric material have a thickness of between about 0.01 inches and about 0.1 inches. It is most preferred that the thickness be in the range from about 0.015 to about 0.05 inch. Preferably, cover sheets 38 and 50 have precurled memory, so that they wrap around the pole 10 readily and will package readily. More specifically, during manufacture, the polymeric sheet is formed in an arc and heated during the manufacture of the sheet to put a permanent curl in the sheet. Thus, when the sheets 38 and 50 are wrapped around the cushioned pole, the sheet is very easy to handle and apply.

The kit has been described for use with a pole such as a lally column in a basement. However, the pole could be any type of column and could in fact have a non-cylindrical shape. More specifically, because the cushion material is flexible and the cover sheets 38 and 50 are flexible, if the kit is applied to a rectangular or square pole, the cover sheets 38 and 50 and the cushioned sheets 16 and 20 will deform and provide a clean, smooth cover which softens the corners of the rectangular or square column.

In addition, while the kits are particularly suited for covering a cylindrical column having a 4 inch diameter and a 7½ foot height, it should be understood that it may be desirable for a user to purchase two kits when applying the product to a pole that has a greater height. More specifically, if the pole had a height of 15 feet, two kits could be utilized. If one wanted to cover two poles each having a height of about 10 feet, the user could purchase three kits and apply three cushion sheets and three cover sheets to one 10-foot pole and apply the other three cover sheets and cushion sheets to the other pole. In addition, while it is desirable to provide a kit with two cover sheets and two cushion sheets, it is possible to provide a kit with three or more cushion sheets and cover sheets.

Further, if one chooses to cover a pole that has a substantially greater diameter than 4 inches, multiple kits could be used. More specifically, if one were attempting to cover a 7½ foot pole, but the pole was 8 inches in diameter, it would be possible to cover such a pole using additional cover sheets and cushion sheets.

A kit for covering a pole in accordance with the present invention is particularly useful in covering lally columns. The kit has four major components, which can be installed in just a few minutes. Further, the kit does not require any specialized tools and simply requires a device for cutting the flexible closed cell plastic film. While the pole cover has been described with respect to a lally column wherein the column has a predetermined height, the kit may also be used in connection with a pole where it is desired to finish and cushion the pole. More specifically, the kit can be used to cover a basketball support pole, volleyball stansions and other devices utilized in sporting events. The kit is particularly easy to ship, because it can be packaged by tightly winding the four major components into a cylinder, shrink wrapping the cylinder, and shipping the cylinder with the instructions and labeling under the shrink wrap. Because the kit is compact, the kits can be shipped in multiple units.

It should be understood that the foregoing is illustrative and not limiting and that obvious modifications may be made by those skilled in the art without departing from the spirit of the invention. Accordingly, reference should be made primarily to the accompanying claims, rather than the foregoing specification, to determine the scope of the invention.

What is claimed is:

1. A cushioned pole cover in combination with a pole comprising a pole having a height and a circumference:

a first sheet of cushioning material having a generally rectangular shape, said first sheet having a width at least equal to the circumference of the pole is wrapped around the pole to form a cushioned pole, said sheet having a height and having top and side edges with the cushioning material extending to and being contiguous with said top and side edges;

a second sheet of cushion material having a generally rectangular shape, said second sheet having a width at least equal to the circumference of said pole is wrapped around the pole to form a cushioned pole, said second sheet having a height and having top and side edges with the cushioning material extending to and being contiguous with said top and side edges;

the combined height of said first and second sheets being greater than the height of said pole, said second sheet of being cut to reduce the height of said second sheet so that the combined height of the first and second sheets is approximately equal to the height of the pole with said cushioning material of the first sheet at said top edge being in abutment with the cushioning material of said second sheet, said first and second sheets defining a cushion sheet having an outer circumference;

a first cover sheet having a generally rectangular shape, said first cover sheet having a width greater than the circumference of the cushioned pole, said first cover sheet having a height and an interior surface said first cover wrapped over the first sheet;

a second cover sheet having a generally rectangular shape, said second cover sheet having a width greater than the circumference of the cushioned pole, said second cover sheet having a height and an interior surface said second cover is wrapped over the second sheet;

the combined heights of said first and second cover sheets being greater than or equal to the height of said pole; and an adhesive on the interior surface of both said cover sheets adheres said cover sheets to themselves to provide a cover surface consisting essentially of a smooth and generally uniform exterior.

2. A cover according to claim 1 wherein the sum of the heights of said first and second cover sheets is substantially greater than the predetermined height of the pole to provide for overlap of said first and second cover sheets when adhered to said cushion sheets.

3. A cover according to claim 2 wherin said cover sheets comprise a polymeric material having a generally smooth exterior finish, said polymeric material having a thickness between about 0.01 and about 0.1 inch.

4. A cover according to claim 3 wherein said cover sheets have a thickness between about 0.015 and about 0.05 inch.

5. A cover according to claim 1 wherein said cushion material has a thickness of between about 0.2 and about 1 inch.

6. A cushioned pole cover in combination with a pole comprising a pole having a height and a circumference:

a first sheet of cushioning material having a generally rectangular shape, said first sheet having a width at least equal to the circumference of the pole is wrapped around the pole to form a cushioned pole, said sheet having a height;

a second sheet of cushion material having a generally rectangular shape, said second sheet having a width at least equal to the circumference of said pole is wrapped around the pole to form a cushioned pole, said second sheet having a height;

wherein said cushion material has a thickness of between about 0.2 and about 1 inch; wherein said cushion material comprises flexible closed cell plastic film comprising at least two polymeric sheets adhered together with air pockets entrapped between said sheets;

the combined height of said first and second sheets being greater than the height of said pole, said second sheet being cut to reduce the height of said second sheet so that the combined height of the first and second sheets is approximately equal to the height of the pole, said first and second sheets defining a cushion sheet having a circumference;

a first cover sheet having a generally rectangular shape, said first cover sheet having a width greater than the circumference of the cushioned pole, said first cover sheet having a height and an interior surface said first cover wrapped over the first sheet;

a second cover sheet having a generally rectangular shape, said second cover sheet having a width greater than the circumference of the cushioned pole, said second cover sheet having a height and an interior surface said second cover is wrapped over the second sheet;

wherein the sum of the heights of said first and second cover sheets is substantially greater than the predetermined height of the pole to provide for overlap of said first and second cover sheets when adhered to said cushion sheets;

an adhesive on the interior surface of both said cover sheets adheres said cover sheets to themselves to provide a cover surface consisting essentially of a smooth and generally uniform exterior.

7. A cover according to claim 6 wherein said cushion material comprises polyethylene.

8. A cover according to claim 1 wherein said adhesive on the interior surface of said cover sheets comprises a strip of adhesive along at least one edge of each of the first and second cover sheets, said adhesive including thereover a release tape that is removable to expose the adhesive.

9. A cover according to claim 8 wherein each of said cover sheets has an elongate strip of adhesive on the interior surface thereof placed around at least three edges of the periphery of each said sheet, said adhesive strip being covered by a release tape which is removable to expose the adhesive.

10. A cover according to claim 9 wherein said first and second cover sheets have substantially identical heights, widths and thicknesses.

11. A cover according to claim 10 wherein said first and second cushion sheets have substantially equal heights, widths and thicknesses.

12. A cushioned pole cover in combination with a pole comprising a pole having a height and a circumference:

a first sheet of cushioning material having a generally rectangular shape, said first sheet having a width at least equal to the circumference of the pole is wrapped around the pole to form a cushioned pole, said sheet having a height and having top and side edges with the cushion material extending to and being contiguous with said top and side edges;

a second sheet of cushion material having a generally rectangular shape, said second sheet having a width at least equal to the circumference of the pole is wrapped around the pole to form a cushioned pole, said second sheet having a height and having top and side edges with the cushion material extending to and being contiguous with said top and side edges;

a first cover sheet having a generally rectangular shape, said first cover sheet having a width greater than the circumference of the cushioned pole, said first cover sheet having a height and an interior surface said first cover wrapped over the first sheet;

a second cover sheet having a generally rectangular shape, said second cover sheet having a width greater than the circumference of the cushioned pole, said second cover sheet having a height and an interior surface said second cover is wrapped over the second sheet;

a sum of the heights of said first and second cover sheets, said sum being greater than or equal to a sum of the heights of said first and second cushion sheets; and an adhesive on the interior surface of both said cover sheets adheres said cover sheets to themselves to provide a cover surface consisting essentially of a smooth and generally uniform exterior.

13. A cover according to claim 12 wherein the sum of the heights of said first and second cover sheets is substantially greater than the sum of said first and second cushion sheets after trimming to provide for overlap of said first and second cover sheets when adhered to said cushion sheets.

14. A cover according to claim 13 wherein said cover sheets comprise a polymeric material having a generally smooth exterior finish, said polymeric material having a thickness between about 0.01 and about 0.1 inch.

15. A cover according to claim 14 wherein said cover sheets have a thickness between about 0.015 and about 0.05 inch.

16. A cushioned pole cover in combination with a pole comprising a pole having a height and a circumference:

a first cushion sheet of cushioning material having a generally rectangular shape, said first cushion sheet having a width at least equal to the circumference of the pole is wrapped around the pole to form a cushioned pole, said first cushion sheet having a height;

a second cushion sheet of cushioning material having a generally rectangular shape, said second cushion sheet having a width at least equal to the circumference of the pole is wrapped around the pole to form a cushioned pole, said second cushion sheet having a height;

wherein said cushion material has a thickness of between about 0.2 and about 1 inch; and wherein said cushion material comprises flexible closed cell plastic film comprising at least two polymeric sheets adhered together with air pockets entrapped between said sheets;

a first cover sheet having a generally rectangular shape, said first cover sheet having a width greater than the circumference of the cushioned pole, said first cover sheet having a height and an interior surface said first cover wrapped over the first sheet;

a second cover sheet having a generally rectangular shape, said second cover sheet having a width greater than the circumference of the cushioned pole, said second cover sheet having a height and an interior surface said second cover is wrapped over the second sheet;

a sum of the heights of said first and second cover sheets, said sum being greater than or equal to a sum of the heights of said first and second cushion sheets; and an adhesive on the interior surface of both said cover sheets adheres said cover sheets to themselves to provide a cover surface consisting essentially of a smooth and generally uniform exterior.

17. A cover according to claim 16 wherein said cushion comprises polyethylene.

18. A cover according to claim 17 wherein said adhesive on the interior surface of said cover sheets comprises a strip of adhesive along at least one edge of each of the first and second cover sheets, said adhesive including thereover a release tape that is removable to expose an adhesive.

19. A cover according to claim 18 wherein each of said cover sheets has an elongate strip of adhesive on the interior surface thereof placed around at least three edges of the periphery of each said sheet, said adhesive strip being covered by a release tape which is removable to expose the adhesive.

20. A cover according to claim 19 wherein said first and second cover sheets have substantially identical heights, widths and thicknesses.

21. A cover according to claim 20 wherein said cushion sheets have substantially equal heights, widths and thicknesses.

* * * * *